(12) United States Patent
Morioka (10) Patent No.: US 7,079,150 B1
(45) Date of Patent: Jul. 18, 2006

(54) IMAGE PROCESSING WHEREIN DECOMPRESSION AND COMPRESSION METHODS PROVIDE FASTER TRANSMISSION OF TEXTURE DATA BETWEEN A TEXTURE BUFFER AND APROCESSOR THAN BETWEEN A STORAGE DEVICE AND A PROCESSOR

(75) Inventor: Seisuke Morioka, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/423,415

(22) PCT Filed: May 7, 1998

(86) PCT No.: PCT/JP98/02032

§ 371 (c)(1),
(2), (4) Date: Nov. 5, 1999

(87) PCT Pub. No.: WO98/50887

PCT Pub. Date: Nov. 12, 1998

(30) Foreign Application Priority Data

May 7, 1998 (JP) ............................. 9-116772

(51) Int. Cl.
*G09G 5/00* (2006.01)
*G06T 11/40* (2006.01)

(52) U.S. Cl. .................. 345/582; 345/587; 345/552

(58) Field of Classification Search ................ 345/582, 345/587, 430, 581, 586, 583, 552
See application file for complete search history.

(56) References Cited

U.S. PATENT DOCUMENTS

| 5,548,709 A | | 8/1996 | Hannah et al. | |
| 5,664,162 A | * | 9/1997 | Dye ........................ | 345/521 |
| 5,696,892 A | * | 12/1997 | Redmann et al. ........... | 345/473 |
| 5,760,783 A | * | 6/1998 | Migdal et al. .............. | 345/587 |
| 5,768,445 A | * | 6/1998 | Troeller et al. ............. | 382/232 |
| 5,790,130 A | * | 8/1998 | Gannett ..................... | 345/587 |
| 5,808,617 A | * | 9/1998 | Kenworthy et al. ......... | 345/421 |
| 5,845,083 A | * | 12/1998 | Hamadani et al. .......... | 709/231 |
| 5,877,771 A | * | 3/1999 | Drebin et al. ............... | 345/586 |
| 5,936,632 A | * | 8/1999 | Cunniff et al. .............. | 345/582 |
| 5,977,997 A | * | 11/1999 | Vainsencher ................ | 345/519 |
| 6,008,820 A | * | 12/1999 | Chauvin et al. ............ | 345/502 |
| 6,011,564 A | * | 1/2000 | Furuhashi et al. .......... | 345/501 |
| 6,166,748 A | * | 12/2000 | Van Hook et al. .......... | 345/522 |
| 6,353,438 B1 | * | 3/2002 | Van Hook et al. .......... | 345/552 |
| 6,411,303 B1 | * | 6/2002 | Fujimura et al. ........... | 345/582 |
| 6,417,860 B1 | * | 7/2002 | Migdal et al. .............. | 345/582 |
| 6,667,744 B1 | * | 12/2003 | Buckelew et al. .......... | 345/502 |
| 2002/0158865 A1 | * | 10/2002 | Dye et al. .................... | 345/419 |

FOREIGN PATENT DOCUMENTS

| JP | 63-106080 | 5/1988 |
| JP | 09-062862 | 3/1997 |

OTHER PUBLICATIONS

Intel, A.G.P. Interface Specification revision 1.0, Jul. 31, 1996 pp. 1–8.*
Knittel G et al; :Hardware for superior texture performance ; Computers and Graphics, GB, Pergamon Press LTD. Oxford; vol. 20, No. 4, Jul. 1996, pp. 475–481.
Kugler; "Designing a high performance texturing circuit"; Proceedings of the Spie; vol. 3021, Feb. 1997; pp. 302–311.

* cited by examiner

*Primary Examiner*—Matthew C. Bella
*Assistant Examiner*—Anthony Blackman
(74) *Attorney, Agent, or Firm*—Keating & Bennett LLP (57) ABSTRACT

The present invention includes a processor, a storage device having compressed texture data, a texture buffer having decompressed texture data. The processor reads the compressed texture data from the storage device and decompresses the texture data. The processor then stores the decompressed texture data in the texture buffer.

26 Claims, 8 Drawing Sheets

IMAGE PROCESSING WHEREIN DECOMPRESSION AND COMPRESSION METHODS PROVIDE FASTER TRANSMISSION OF TEXTURE DATA BETWEEN A TEXTURE BUFFER AND APROCESSOR THAN BETWEEN A STORAGE DEVICE AND A PROCESSOR

BACKGROUND OF THE INVENTION

1. Field of the Invention

The present invention relates to an image processing unit and image processing method for computer graphics.

2. Description of the Background Art

Providing real and gorgeous images in a computer graphic (CG) system using texture mapping is demanded. The easiest means for generating such real and gorgeous images is using a large volume of texture data.

However, in a system which executes high quality texture mapping such as tri-linear mapping, very high-speed access is demanded for the texture buffer, and to use a large volume of data, a large capacity high-speed storage device must be provided. This requires enormously high cost, which makes it difficult to provide a large capacity storage device.

SUMMARY OF THE INVENTION

To overcome the problems discussed above, preferred embodiments of the present invention provide an apparatus and method for generating excellent images while using a relative small capacity texture buffer. An image processing apparatus according to the present invention includes a first storage device for storing texture data, a second storage device for storing a part of the above texture data, and a processing section for executing image processing based on the texture data in the above second storage device, where the above processing section updates the texture data by reading the texture data from the first storage device and writing that data to the second storage device in a predetermined case.

Here the predetermined case is a case when updating the texture data is necessary, such as the case when texture data not stored in the second storage device must be used. The texture data may be updated in advance when processing capability is sufficient. The storage devices are not only semiconductor memories but include such external devices as HDD and CD-ROM.

The image processing apparatus according to the present invention is characterized in that the above mentioned first storage device stores data including compressed texture data, and the above mentioned processing section further includes a data decompression circuit for decompressing the read texture data so as to write the decompressed data to the second storage device.

Here the texture device to be stored in the first storage device can be non-compressed data, data containing both compressed and non-compressed data, or compressed data. The image processing apparatus according to the present invention is characterized in that the above mentioned processing section further include a first-in-first-out storage device for receiving the read texture data, temporarily storing this data, and outputting the data to the above mentioned data decompression circuit.

The image processing apparatus according to the present invention is characterized in that the above mentioned processing section further includes a palette transformation circuit for executing palette transformation when the texture data is updated.

The image processing apparatus according to the present invention is characterized in that the above mentioned processing section further includes a mip map generation circuit for generating a mip map when the texture data is updated.

An image processing method according to the present invention uses a first storage device for storing texture data and a second storage device for storing a part of the texture data, so as to execute image processing based on the texture data in the second storage device, and includes an updating step for updating the texture data by reading the texture data from the first storage device and writing that data to the second storage device in a predetermined case.

The image processing method according to the present invention further includes a data decompression step for decompressing the read texture data when the data stored in the first storage device is compressed texture data, characterized in that the decompressed data is written to the second storage device.

The image processing method according to the present invention further comprises a palette transformation step for executing palette transformation when the texture data is updated.

The image processing method according to the present invention further includes a mip map generating step for generating a mip map when the texture data is updated.

Other features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

DESCRIPTION OF PREFERRED EMBODIMENTS OF THE PRESENT INVENTION

Apparatus and method of preferred embodiment of the present invention will now be explained. A preferred embodiment of the present invention has a mechanism to update texture in real-time at high-speed.

Figure 1:
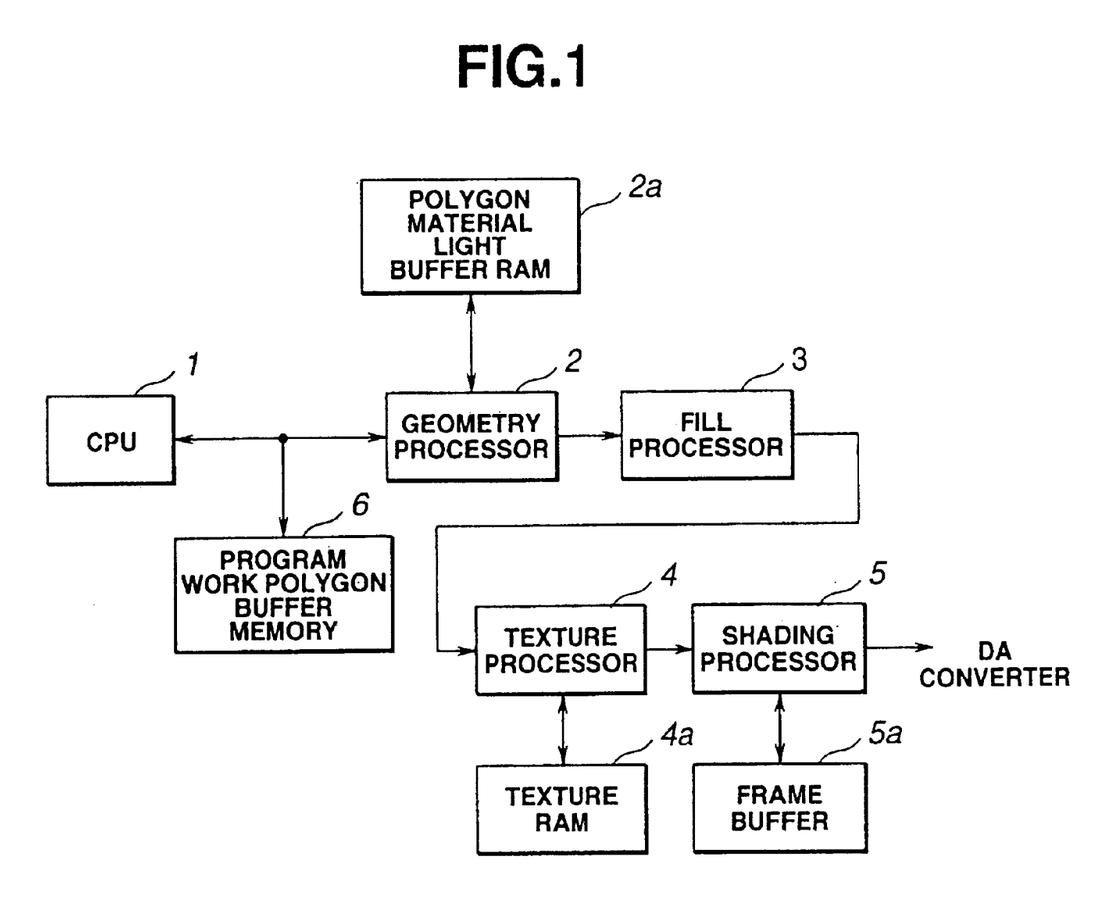
FIG. 1 is a function block diagram including an image processing apparatus according to a preferred embodiment 1 of the present invention.

FIG. 1 is a block diagram including an image processing apparatus according to a preferred embodiment of the present invention. In FIG. 1, 1 is a CPU (Central Processing Unit) which manipulates objects in a virtual space, receives information thereof, and executes various controls. 2 is a geometry processor, which executes the coordinate transformation of polygons, such geometric transformation (vector arithmetic operations) as clipping and perspective transformation, and luminance calculation in three dimensional computer graphics a high-speed. 2a is a polygon material light buffer RAM, which is a buffer for storing effective polygon data, material data and light data for one frame when the geometry processor 2 executes processing. A polygon is a polygon constituting a three-dimensional body in a virtual space. A breakdown of data to be stored in the buffer memory 2a follows.

Link information, coordinate information and other attribute information of polygons.

LINK X, LINK Y, X, Y, iz, Tx, Ty, Nx, Ny, Sign Nz, Alpha, Light ID, Material ID

Material information

Depth enable, Depth function, Depth density, Texture enable, Fog enable, translucency enable, texture type, texture function, offset x, y, size x, y, repeat x, y, mirror x, y, color id, Sine, Material specular, Material emission, Polygon color, Texture mode, blend mode, etc.

Light information

Light Position, Light Direction, Light Type, Attenuation Cutoff, Spotexo, Light Color, Light Ambient, etc.

3 is a fill processor for executing hidden surface removal processing. The fill processor 3 fills a polygon in an area, and determines each information on the polygon which is closest to the viewer for each pixel.

4 is a texture processor. The texture processor 4 pastes texture on each pixel in an area. Texture mapping is a process for creating an image by pasting (mapping) patterns (texture), which are defined separately from the shape, on the surface of an object for which shape has been defined. 4a is a texture RAM, where a texture map for the texture processor 4 to execute processing is stored.

5 is a shading processor. Shading is a method to express the shadow of an object comprised of polygons while considering the normal line vector of a polygon, position and color of a light source, position of view point, direction of line of sight, and other factors. The shading processor 5 determines the luminance of each pixel in an area. 5a is a frame buffer for storing image data to be displayed on a screen. Data is sequentially read from the frame buffer 5a, and after the digital data is converted to analog signals, the analog signals are supplied to such displays as a CRT, liquid crystal display and plasma display, which are not depicted here.

6 is a program work polygon buffer RAM for storing the programs of the CPU 1 and commands to the graphic processor (e.g. database of polygons, displays lists). This buffer memory 6 is a work memory of the CPU 1 as well.

The fill processor 3, texture processor 4 and shading processor 5 execute rendering for creating pictures using models defined in the virtual space coordinates. In rendering, each area is processed sequentially from the upper left of the screen. Rendering processing is repeated for the number of areas.

Now details on the image processing apparatus according to a preferred embodiment of the present invention will be described with reference to the functional block diagrams in FIG. 2 to FIG. 5.

Figure 2:
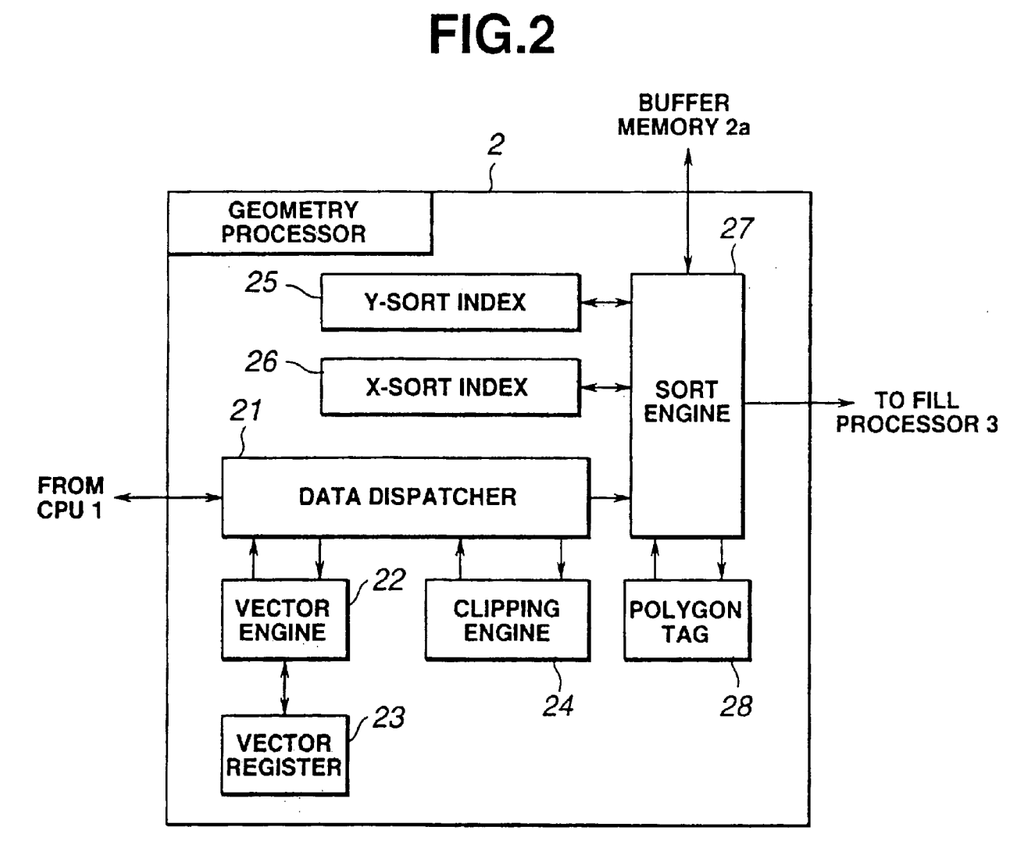
FIG. 2 is a functional block diagram of a geometry processor of the image processing apparatus according to a preferred embodiment of the present invention.

FIG. 2 is a functional block diagram of the geometry processor 2. In FIG. 2, 21 is a data dispatcher, which reads a command from the buffer RAM 6, analyzes the command, controls a vector engine 22 and clipping engine 24 based on the analysis result, and outputs the processed data to a sort engine 27.

22 is the vector engine for executing vector arithmetic operations. Vectors to be handled are stored in a vector register 23.

23 is the vector register for storing vector data for the vector engine 22 to operate.

24 is the clipping engine for executing clipping.

25 is a Y-sort INDEX, for sorting the Y index for a sort engine 27 to execute Y sorting.

26 is an X-sort INDEX, for storing the X index for the sort engine 27 to execute X sorting.

27 is the sort engine (sort engine) for searching a polygon to enter the target fragment in the buffer 6 by executing X sorting and Y sorting. The searched polygon is stored in the buffer memory 2a, and is also sent to the fill processor 3 for rendering. The sort engine 27 also controls a polygon TAG 28 and a polygon cache 34.

28 is the polygon TAG, which is a buffer for storing the TAG of the polygon cache 34.

Figure 3:
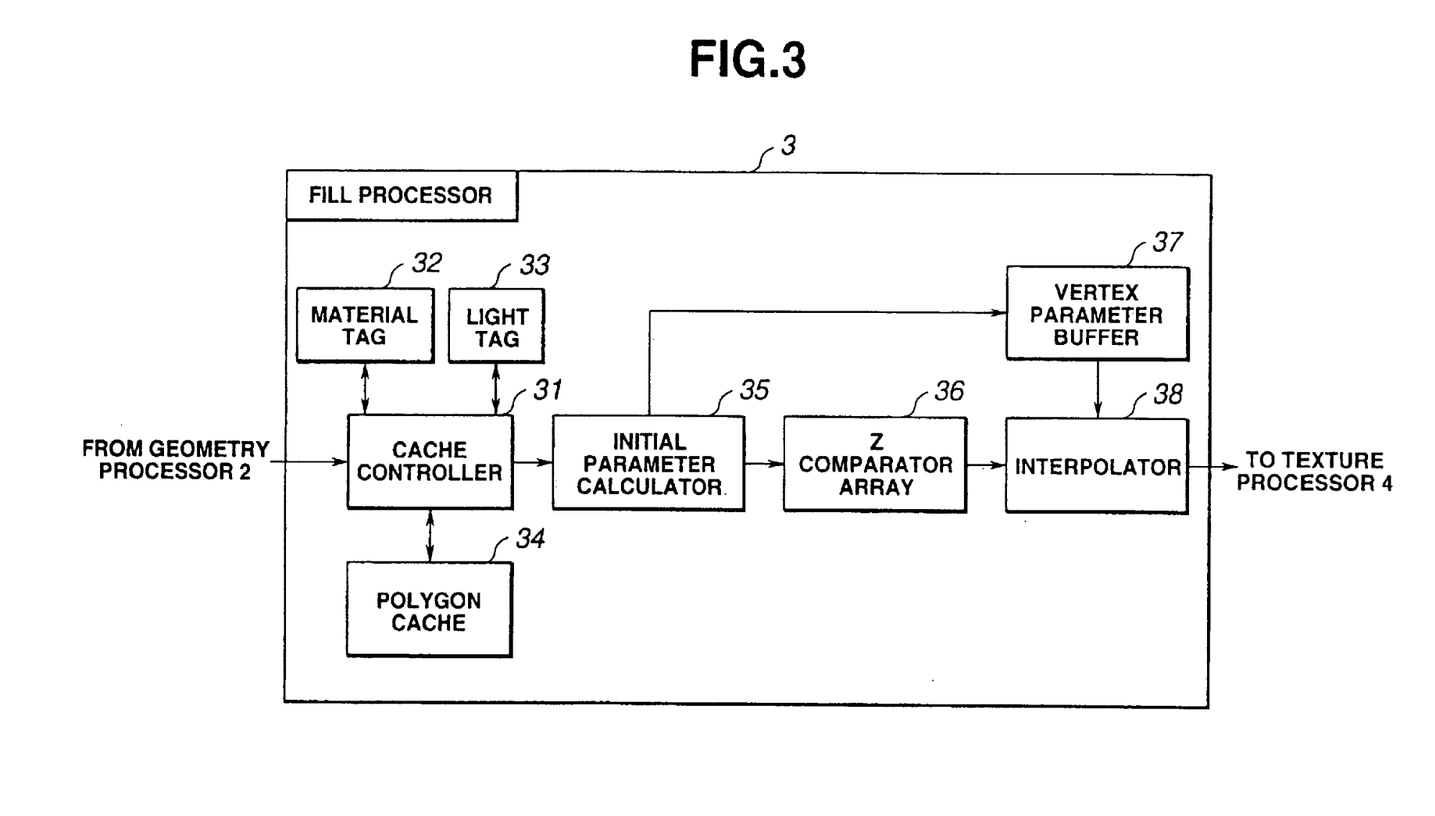
FIG. 3 is a functional block diagram of a full processor of the image processing apparatus according to a preferred embodiment of the present invention.

FIG. 3 is a functional block diagram of the fill processor 3. In FIG. 3, 31 is a cache controller for controlling the later mentioned material caches 42, 45, 51b, 52a and 53a, and a light cache 51a.

32 is a material TAG for storing the TAG of the later mentioned material caches 42, 45, 51b, 52a and 53a, and light cache 51a.

33 is a light TAG, which is a buffer for storing the TAG of the later mentioned light cache 51a.

34 is a polygon cache, which is a chance memory of polygon data.

35 is an initial parameter calculator, for determining the initial value of DDA.

36 is a Z comparator array for executing Z comparisons between polygons for hidden surface removal processing, and also for padding the polygon ID and internal ratios t0, t1 and t2. The Z comparator array 36 includes 8×8=64 units of Z comparators. Since these Z comparators operate in parallel, 64 pixels can be simultaneously processed. Each Z comparator stores data on a polygon. For example, a polygon ID, iz, t0, t1, t2, window, stencil and shadow are stored.

37 is a vertex parameter buffer, which is a buffer for storing parameters of a vertex of a polygon. Corresponding to the Z comparator array 36, the vertex parameter buffer has a size capacity for 64 polygons.

38 is an interpolator for calculating the parameters of a pixel by interpolation based on the calculation result of the Z comparator array 36, t0, t1, t2, iz and the content of the vetex parameter buffer 37.

Figure 4:
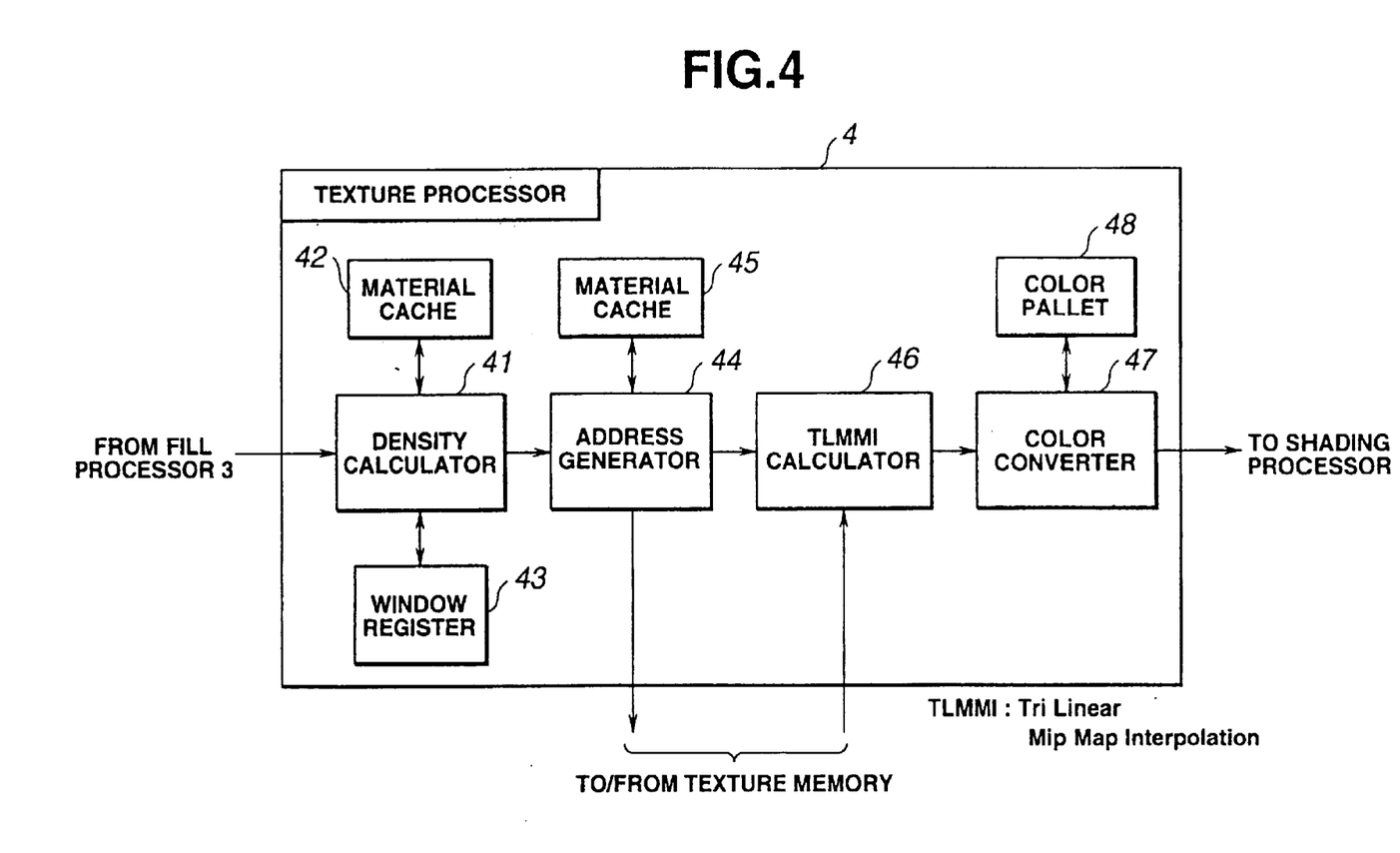
FIG. 4 is a functional block diagram of a texture processor of the image processing apparatus according to a preferred embodiment of the present invention.

FIG. 4 is a functional block diagram of the texture processor 4. In FIG. 4, 41 is a density calculator for calculating the blending ratio for fog or depth cueing.

42 is a material cache for storing data on depth information. For example, Depth enable, Depth function, Depth density, Depth and z, Texture enable, and Fog enable are stored.

43 is a window register, which is a buffer for storing information on windows. For example, kz, cz, fog function, fog density and fog and z are stored.

44 is an address generator for calculating addresses on a texture map based on the texture coordinates Tx, Ty and LOD.

45 is a material cache for storing data on material. For example, translucency enable, texture type, offset x, y, size x, y, repeat x, y, mirror x, y, and color id are stored.

46 is a TLMMI (Tri-Linear Mip Map Interpolation) calculator for executing tri-linear mip map interpolation, which is three dimensional interpolation. Mip map is a technique for anti-aliasing when texture mapping is executed, that is, a technique for removing texture jaggies. Mip map is based on the following principle. Originally, the color (luminance) of an object face to be projected to one pixel must be a mean value of colors of the corresponding mapping area. Otherwise, jaggies become outstanding, which drops the quality of texture dramatically. However, if a mean value is determined for each pixel, the calculation load becomes too high, which takes time to process, and which requires a high-speed processor. Mip map solves this problem. In mip map, a plurality of mapping data having a width which is a multiple of 2 are prepared in advance so as to simplify the tabulation of colors (luminance) of the mapping area corresponding to one pixel. A size of the entire mapping area corresponding to one pixel is between any two data of these plurality of data having a width which is a multiple of 2. By comparing these two data, the color of the corresponding mapping area is determined. For example, when screen A (×1) and screen B (×½) exist, the pixels of screen A and the pixels of screen B corresponding to each pixel of screen C (×1/1.5) are determined respectively. At this time, the color of the pixel of screen C is a color between the pixel in screen A and screen B.

47 is a color converter for executing color conversion at 4 bit texel. 48 is a color palette where color information at 4 bit texel is stored. The color palette 48 stores colors to be used for drawing graphics. Colors that can be used for one pixel are determined corresponding to the content of the color palette 48.

Figure 5:
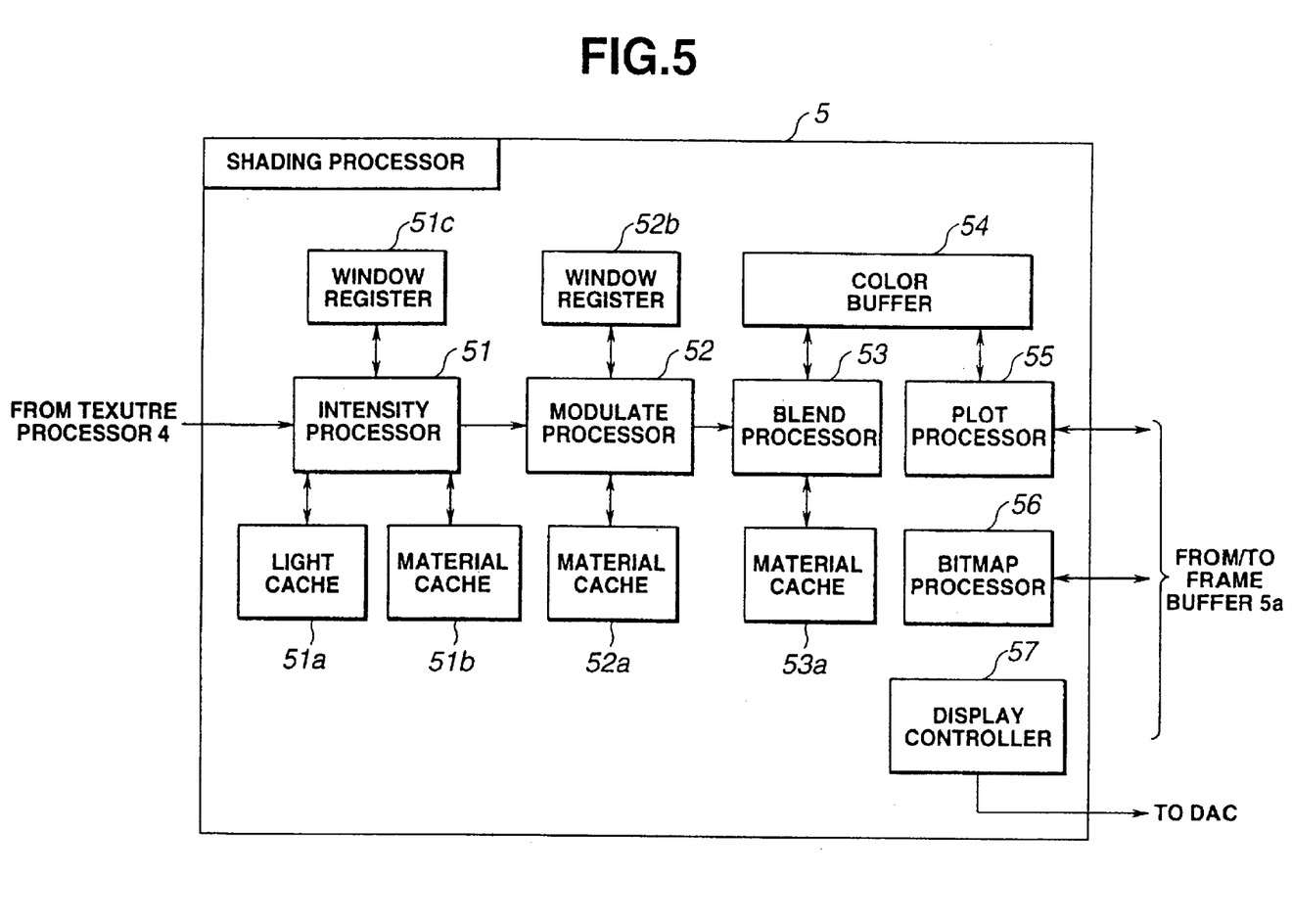
FIG. 5 is a functional block diagram of a shading processor of the image processing apparatus according to a preferred embodiment of the present invention.

FIG. 5 is a functional block diagram of the shading processor 5. In FIG. 5, 51 is an intensity processor for calculating the luminance for polygons after texture mapping.

51a is a light cache for storing light information. For example, Light Position, Light Direction, Light Type, Attenuation, Cutoff, Spotexp. Light Color and Light Ambient are stored.

51b is a material cache for storing information on material. For example, Sine, Material specular, material emission are stored.

51c is a window register for storing information on windows. For example, Screen center, Focus, Scene ambient are stored.

52 is a modulate processor for executing associations of polygon color and texture color, intensity modulation and fog processing.

52a is a material cache for storing information on materials. For example, Polygon color, and Texture mode are stored.

52b is a window register, which is a buffer for storing information on windows. For example, Fog Color is stored.

53 is a blend processor for blending data on the color buffer 54 and writing the blended data to the color buffer 54. The blend processor 53 blends the current pixel color and the pixel color of the frame buffer based on the values of the blend rate register, and writes the blended data to the frame buffer of the bank indicated by the light bank register. With the blend processor 53, residual image processing can be executed.

53a is a material cache for storing information on materials. For example, blend mode is stored.

54 is a color buffer, which is an 8×8 size color buffer. The color buffer 54 has a double bank structure.

55 is a plot processor for writing data on the color buffer 54 to the frame buffer 5a.

56 is a bitmap processor for executing bit map processing.

57 is a display controller, which reads data of the frame buffer 5a, supplies the data to DAC (Digital to Analog Converter), and displays the data on a display which is not depicted here.

Figure 6:
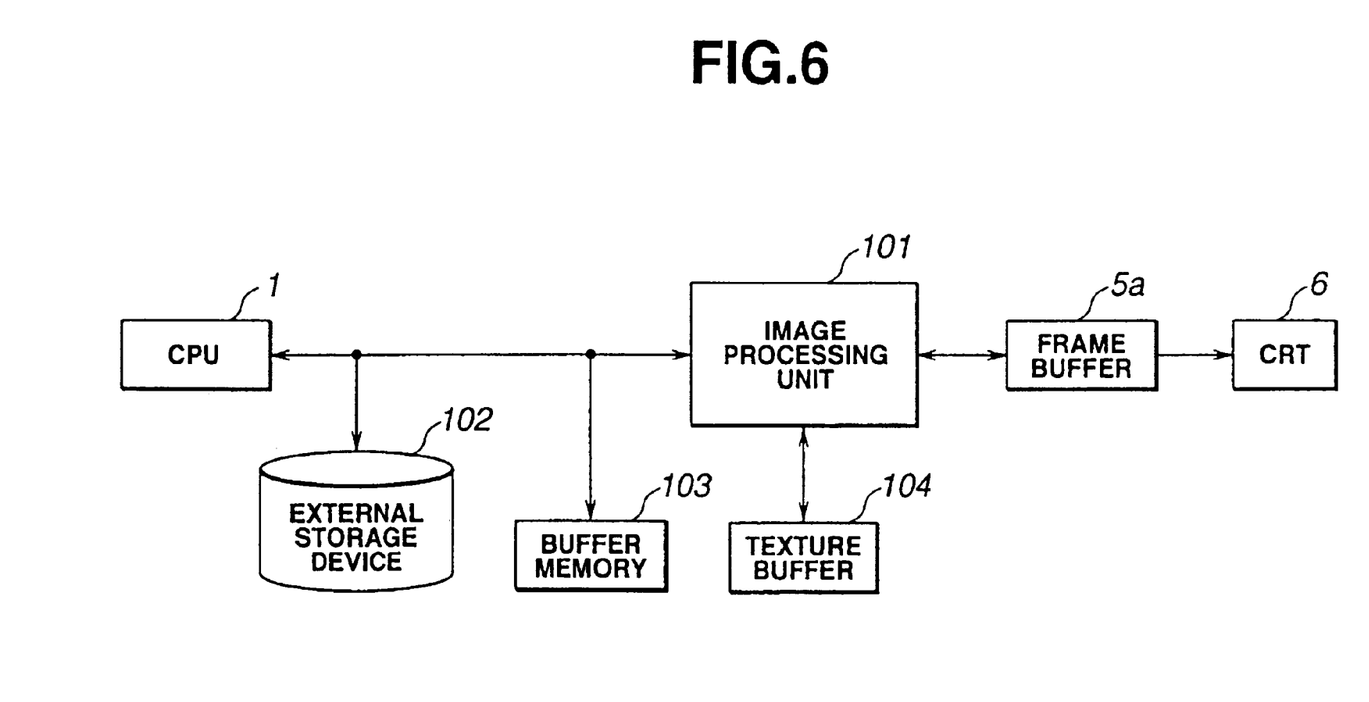
FIG. 6 is a functional block diagram including an image processing apparatus according to a preferred embodiment of the present invention.

FIG. 6 is a block diagram including the image processing apparatus shown in FIG. 1–FIG. 5, created for explanatory purposes. The image processing unit 101 is connected with the CPU 1 and exchanges commands and data with the CPU 1, and accesses an external storage device 102, such as a hard disk, a buffer memory 104, a texture buffer 104 and a frame buffer 5a. The texture buffer 104 stores texture maps. This texture buffer 104 executes high quality texture mapping in real-time, therefore a high-speed operation is required. The buffer memory 103 also stores compressed texture data along with other data. The buffer memory 103 is a general buffer memory, which has a slower speed and larger capacity then the texture buffer 104. The image processor unit 101 of preferred embodiments 1 of the present invention has a function for reading compressed texture data from the buffer memory 103, executing data decompression, and writing that data to the texture buffer 104, in addition to ordinary processing.

Figure 7:
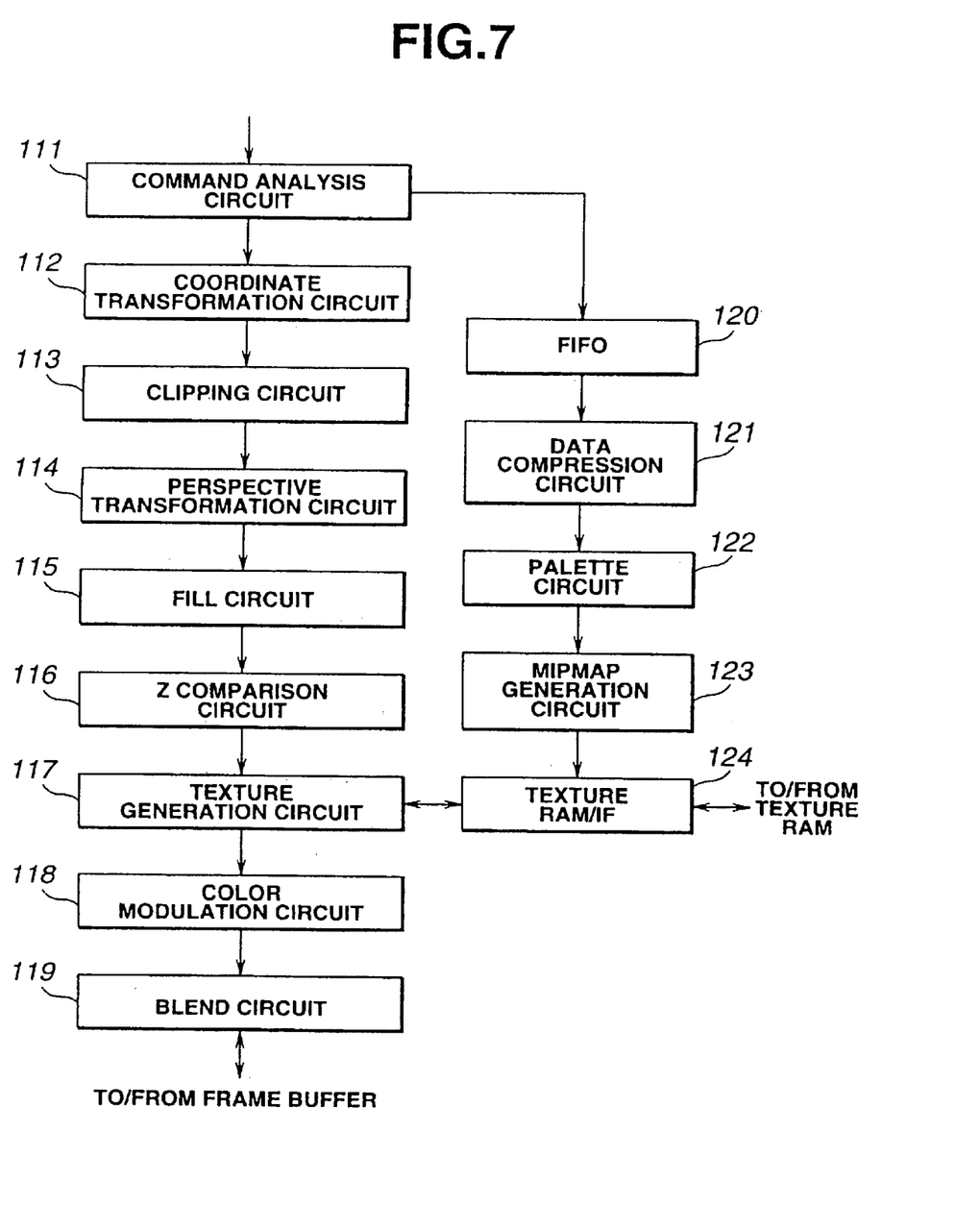
FIG. 7 is a block diagram illustrating texture data processing in the image processing unit in a preferred embodiment of the present invention.

FIG. 7 is a block diagram illustrating texture data processing in the image processing unit 101. Numerals 112–119 are circuits for processing a conventional three dimensional computer graphic system. These circuits are cascaded. Numerals 111, 120–124, on the other hand, are circuits for executing the image generating process of a preferred embodiment of the present invention. These circuits are cascaded, and the final output is input to the texture generation circuit 117 via the texture RAM interface 124.

A coordinate transformation circuit 112 receives a command from a later mentioned command analysis circuit 111 and executes coordinate transformation for generating images. A clipping circuit 113 clips a portion outside the field of view after the data is transformed to an eye coordinate system. A perspective transformation circuit 114 transforms the eye coordinate system to the screen coordinate system. A fill circuit 115 fills transformed images. A Z comparison circuit 116 compares Z values which indicate perspective, and executes hidden surface removal by the Z sort method. A texture generation circuit 117 generates texture based on the texture data. A color modulation circuit 118 and a blend circuit 119 adjust the color of images.

A command analysis circuit 111 analyzes commands from the CPU 1, distinguishes a command (data) for image generation and a command (data) for updating texture data, and channels the commands to the coordinate transformation circuit 112 and FIFO 120 (First-In-First-Out) 120. The FIFO 120 is a first-in-first-out memory for absorbing the difference between the data read speed and the data decompression/write speed. FIFO 120 is a memory used for data exchange between two parts which have different timing, and can adjust the difference even if timing is different at both ends of FIFO 120. A data decompression circuit 121 is a circuit for decompressing the compressed data which was input. A palette transformation circuit 122 is a circuit for executing palette transformation. A MIP MAP generating circuit 123 is a circuit for automatically generating a mip map. Mip map is a technique for anti-aliasing when texture mapping is executed, that is, a technique for removing jaggies. A texture RAM interface (I/F) 124 is an interface with a texture buffer (RAM) 104, which has a mechanism for mediating between ordinary image processing and updating texture.

The operation will now be explained.

Data compression is very effective for such image data as a texture map. For example, a full color (16,000,000 colors) image can be expressed by 8 bit per texel, since in most cases several hundred colors are actually used. In mip map, a plurality of mapping data having a width which is a multiple of 2 is prepared to simplify the tabulation of colors (luminance) of the mapping areas corresponding to one pixel, and a mip map, which is a simple reduction of the original image, can be easily generated only if the original image is available. The image data often has the same color as the texel color of a nearby area where many repeat patterns exist, therefore a general compression algorithm, such as fun length and slide dictionary, can easily be applied.

If the data is stored in a compressed state, however, decompression of the data is required to use the data, which takes time. Since texture data is accessed at high-speed, compressed data is not easy to use, and the data must be stored in a non-compressed state.

With the foregoing in view, the embodiment 1 of the present invention makes high-speed access possible and improves the efficiency of memory use by storing data in a non-compressed state in the texture buffer 104, which must be accessed at high-speed, storing compressed data in the other buffer (buffer memory 103), and has a mechanism update the texture buffer 104 in real-time.

In FIG. 7, when a command (data) for image generation is transferred from the command analysis circuit 111 to the coordinate transformation circuit 112, texture generation, color modulation, and blending processing are executed based on coordinate transformation, clipping, perspective transformation, filling, Z comparison, and non-compressed data in the texture buffer 104.

When a command (data) for updating the texture data is transferred from the command analysis circuit 111 to the FIFO 120, the following processing is executed.

Figure 8:
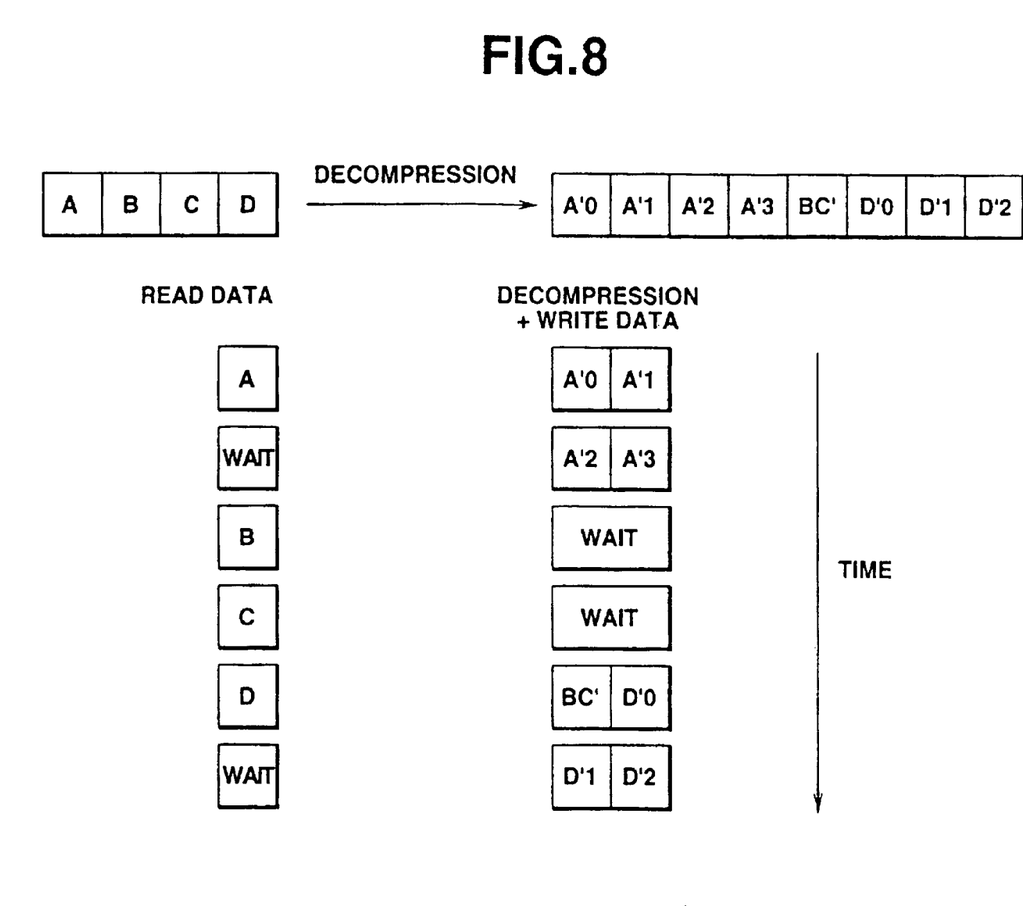
FIG. 8 is a diagram for explaining the timing between data read and decompression/write in the image processing unit according to a preferred embodiment of the present invention.

The FIFO 120 is a buffer to adjust the data read speed and data decompression/write speed. Data flow is different between reading and decompression+writing. Since data read involves simple memory access, the data transfer speed is constant, such as 1 byte at 1 clock. But it is difficult to estimate how many bytes the data will become when the data is decompressed, because this depends on the compression method. For example, 1 byte data, which was input, may become 2 bytes or 0.5 bytes. As FIG. 8 shows, when 4 bytes of input data A, B, C and D become 8 bytes A'0, A'1, A'2, A'3, BC', D'0, D'1 and D'2, if the bus transfer capability of output is twice that of input, it seems that data volume will be balanced and no data wait time occurs. However, in actual processing, wait time occurs since data flow is not constant, therefore extra wait states must be created. In the example in FIG. 8, for example, a wait state is required before reading the data B after reading the data A, and after reading the data D, respectively. Also two wait states are required after A'2 and A'3, which is data after decompression.

So the FIFO 120 adjusts the timing. In the FIFO 120, data written at any time by the input side can be output at any time in the sequence of writing by the output side. Therefore the CPU 1 can issue a command regardless of the data decompression state in the image processing unit 101. The CPU 1 does not have to distinguish a command (data for image generation from a command (data) for updating the texture data.

When the data decompression circuit 121 receives a command (compressed data) for updating the texture data, the data compression circuit 121 decompresses the data, and returns the data to a non-compressed state. The compressed data has been stored in the external storage device 102 or the buffer memory 103.

In a CG system using texture mapping, a large volume of texture data must be used to generate real and gorgeous images most easily. Therefore there is an enormous number of types of compressed data pre-stored. On the other hand, there is much less texture data, which is actually used simultaneously. When the texture data in the texture buffer 104 is insufficient, the CPU 1 issues a command to read the necessary compressed data from the buffer memory 103, or the external storage device 102 decompresses the data, and writes the data to the texture buffer 104. Since the CPU 1 knows which texture data to use and what kind of texture data has been stored in the texture buffer 104, the CPU 1 can easily issue the command by comparing the texture data to be used and the texture data stored in the texture buffer 104.

Compression and decompression are executed according to a commonly known algorithm. For example, run length encoding, sliding dictionary, Huffman, and discrete cosine transformation are used. For the format, JPEG combining discrete cosine transformation and Huffman, for example, is used.

Run length encoding is an encoding method used when a repeat of the same pattern appears frequently. The length of a pattern is called "the run". When the run is long, the data length can be shortened by encoding the run before transferring, rather than transferring the pattern as is.

Sliding dictionary is a method where previous data is stored, and this data is used for data compression. This method is effective for mesh patterns.

Huffman is a code to be created such that the average number of bits per sample becomes a minimum when quantized sample sets are encoded. If Huffman is used, palette transformation can be executed with great flexibility. For example, when color is simple, such as in the case of images for animation, long patterns often appear while short patterns rarely appear. In this way, appropriate encoding is possible according to the nature of the image.

JPEG (Joint Photographic Experts Group) is a color still picture compression system established by a group promoting the standardization of a color still picture compression system. JPEG is widely used for multimedia applications which handle still pictures, such as on personal computers.

For the texture data after data decompression is executed, palette transformation is executed by the palette transformation circuit 122. Then the MIP Map generation circuit 123 generates a mip map corresponding to the decompressed data.

The texture data after data decompression is executed is written to the texture buffer 104 by the texture RAM interface 124. When the texture buffer 104 does not have an open area, the texture data overwrites other data. For example, data not frequently used, old data, or data used a long time ago, can be selected to be overwritten.

In this way, according to preferred embodiments of the present invention, virtually any texture data can be used, even if the capacity of the texture buffer is small.

Since the texture data to be stored in the low speed buffer memory is compressed, memory space can be conserved.

Also because the data decompression mechanism is included in the system, non-compressed data flows only over the high-speed bus of the texture buffer 104, and compressed data flows over the low speed bus, which allows sufficient use of the transfer capability of the buses.

In the above description of the present invention, data for arithmetic operations and processing of various memories, and the operation programs of the CPU are provided to the image processing apparatus as a storage medium, such as a CD-ROM, cassette ROM, LD, FD and HD. The storage medium includes a medium used for communication, such as a server and communication lines of the Internet, LANs and personal computer communications.

The present invention comprises a first storage device for storing texture data and a second storage device for storing a part of the texture data, and has an updating stop for reading texture data from the first storage device and writing that date to the second storage device in a predetermined case, therefore many texture data can be used while using the small capacity second storage device. As a result, both low cost and high-speed processing can be implemented.

The present invention also has a first-in-first-out storage device, which receives the read texture data, temporarily stores the data, and outputs the data to the data decompression circuit. Therefore a timing adjustment in data exchange is unnecessary.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for image processing, comprising:
   a processor including a data decompression circuit;
   a first storage device having texture data and electronically coupled to said processor; and
   a texture buffer having decompressed texture data and being directly connected to said processor; wherein
   transmission of texture data between said texture buffer and said processor is faster than transmission of texture data between said storage device and said processor; and
   said first storage device is defined by a CPU work memory or an external memory device.

2. The apparatus of claim 1, further comprising a frame buffer, wherein said processor stores image data in said frame buffer.

3. The apparatus of claim 1, wherein said processor reads decompressed texture data contained in said texture buffer and performs image processing of said decompressed texture data for conversion to image data.

4. The apparatus of claim 1, wherein said processor reads compressed texture data from said first storage device, said data decompression circuit decompresses said read compressed texture data, and said processor stores said decompressed texture data in said texture buffer.

5. The apparatus of claim 4, wherein said processor including a FIFO storage device which temporarily stores said read compressed texture data.

6. The apparatus of claim 5, wherein said data decompression circuit receives said read compressed texture data from said FIFO storage device.

7. The apparatus of claim 4, wherein said processor includes a palette transformation circuit, said palette transformation circuit performing palette transformation of said decompressed texture data.

8. The apparatus of claim 4, wherein said processor includes a mip map generation circuit, said mip map generation circuit generating a mip map of said decompressed texture data.

9. The apparatus of claim 1, wherein said texture data in said first storage device is compressed.

10. The apparatus of claim 1, wherein said first storage device is not directly connected to said texture buffer.

11. An apparatus for image processing, comprising:
    a processor including a data decompression circuit;
    a first storage device having texture data and electronically coupled to said processor;
    a texture buffer having decompressed texture data and being directly connected to said processor; and
    a first data bus and a second data bus, wherein said first data bus carries texture data between said texture buffer and said processor faster than said second data bus carries texture data from said storage device and said processor; and
    said first storage device is defined by a CPU work memory or an external memory device.

12. The apparatus of claim 11, further comprising a frame buffer, wherein said processor stores image data in said frame buffer.

13. The apparatus of claim 11, wherein said processor reads decompressed texture data contained in said texture buffer and performs image processing of said decompressed texture data for conversion to image data.

14. The apparatus of claim 11, wherein said processor reads compressed texture data from said first storage device, said data decompressed circuit decompresses said read compressed texture data, and said processor stores said decompressed texture data in said texture buffer.

15. The apparatus of claim 14, wherein said processor includes a FIFO storage device which temporarily stores said read compressed texture data.

16. The apparatus of claim 15, wherein said data decompression circuit receives said read compressed texture data from said FIFO storage device.

17. The apparatus of claim 14, wherein said processor includes a palette transformation circuit, said palette transformation circuit performing palette transformation of said decompressed texture data.

18. The apparatus of claim 14, wherein said processor includes a mip map generation circuit, said mip map generation circuit generating a mip map of said decompressed texture data.

19. The apparatus of claim 11, wherein said texture data in said first storage device is compressed.

20. The apparatus of claim 11, wherein said first storage device is not directly connected to said texture buffer.

21. An image processing method comprising the steps of:
providing compressed texture data in a storage device defined by a CPU work memory or an external memory device;
reading said compressed texture data from said storage device and decompressing said compressed texture data;
storing said decompressed texture data in a texture buffer; and
directly connecting a processor to said texture buffer, and transferring data between said texture buffer and said processor faster than transferring data between said storage device and said processor.

22. The method of claim 21, further comprising the step of converting said decompressed texture data to image data, and storing said image data in a frame buffer.

23. The method of claim 21, further comprising the step of performing palette conversion of said decompressed texture data prior to said step of storing said texture data.

24. The method of claim 21, further comprising the step of generating a mip map of said compressed texture data prior to said step of storing said decompressed texture data.

25. The method of claim 21, wherein said step of storing said decompressed texture data includes the step of updating said decompressed texture data in said texture buffer with new decompressed texture data.

26. The method of claim 21, wherein said storage device is not directly connected to said texture buffer.

* * * * *